Figure 1:
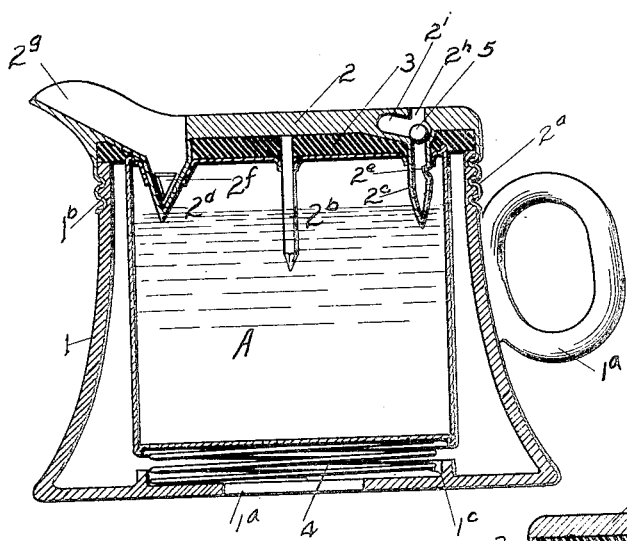

April 23, 1929.  L. B. PAULSON  1,710,239
MILK CAN CONTAINING PITCHER

Filed June 3, 1925

Inventor
LEO B. PAULSON
By A. B. Bowman
Attorney

Patented Apr. 23, 1929.

1,710,239

UNITED STATES PATENT OFFICE.

LEO B. PAULSON, OF SAN DIEGO, CALIFORNIA.

MILK-CAN-CONTAINING PITCHER.

Application filed June 3, 1925. Serial No. 34,575.

My invention relates to can containing pitchers, particularly adapted for containing condensed milk cans and dispensing the contents therefrom, although the same is applicable for containing hermetically sealed cans containing other products.

The objects of my invention are: first, to provide a means for containing hermetically sealed cans and providing a spout at the upper portion thereof for conveniently dispensing the contents of said can; second, to provide a means of this class for containing and supporting hermetically sealed cans, said means having means for puncturing the one ends of said cans for venting and for providing a spout for conveniently draining the contents therefrom; third, to provide a pitcher for dispensing liquids, adapted to contain hermetically sealed cans and provided with a removable cover having can puncturing means at the inner side thereof and vent and spout means at the outer side thereof communicating with the puncturing means to facilitate the dispensation of the liquids in said cans, fourth, to provide a container having a cover screwably secured to the one end thereof, said container being adapted to receive a can, the cover of the container being provided with a can centering means, and a can puncturing vent means and another puncturing means communicating with a spout at one end of the cover for dispensing the liquid of the can adapted to be contained in said container through said last mentioned puncturing means; fifth, to provide a container of this class having a screwable cover provided with vent and spout means communicating with puncturing means at the inner side thereof, whereby the one ends of cans adapted to be contained in said container are punctured by screwing said cover on the open end of said container; sixth, to provide spring means in the bottom of an hermetically sealed can containing container for yieldably supporting a can against the cover of said container and to facilitate the removal of said can from said container; seventh, to provide a ball check valve means in connection with the puncturing vent means in the cover of a can supporting container for excluding air from the can adapted to be contained in the container when not dispensing the contents from said can; eighth, to provide as a whole a novelly constructed can containing pitcher, and ninth, to provide a device of this class which is simple and economical of construction proportionate to its functions, durable, practical, a device which may be easily kept sanitary and which will not readily deteriorate or get out of order.

Figure 2:
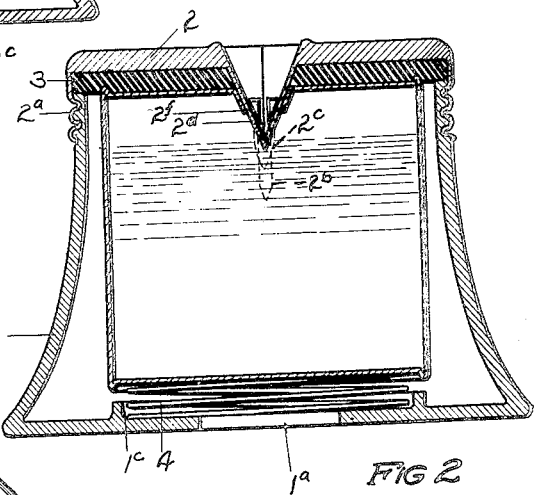
Figure 3:
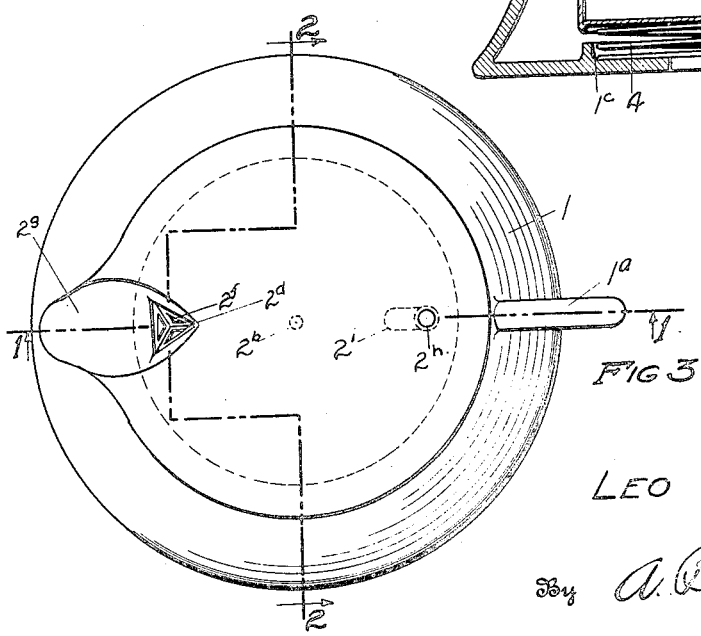

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, which form a part of this application, in which:

Figure 1 is a sectional elevational view of my can containing pitcher in its preferred form of construction, with the section taken through 1—1 of Fig. 3, certain parts and portions thereof being in elevation to facilitate the illustration; Fig. 2 is another sectional elevational view thereof, taken through 2—2 of Fig. 3, and Fig. 3 is a plan view thereof.

Like characters of reference refer to similar parts and portions throughout the several views of the drawings.

My can containing pitcher consists, in its preferred form of construction as illustrated, essentially of a container 1 provided at its upper open end with a cover 2 having puncturing means at its inner side and a spout at its outer side, a gasket 3 for sealing the space between the upper side of the can A adapted to be positioned in the container 1 and the inner side of the cover 2, and a spring 4 for yieldably supporting the can A against the gasket 3 at the inner side of the cover 2.

The container 1 is constructed substantially in the form of the lower end of a conventional pitcher and provided at one side with a handle $1^a$. Said container may be cast of metal, glass, porcelain, or any other suitable material. The upper open end of the container 1 is provided with external threads $1^b$ over which is adapted to be screwed an internally threaded flange $2^a$ extending downwardly from the peripheral portion of the cover 2. Said cover is provided at its central portion with an inwardly extending cam positioning or centralizing puncturing member $2^b$. Positioned at diametrically opposite sides of the puncturing member $2^b$ and also extending inwardly from the inner side of the cover 2 are a hollow can puncturing vent member $2^c$ and a hollow pyramid-shaped can puncturing member $2^d$, it being noted that the puncturing member 2^b extends a considerably greater distance from the inner side of the cover 2 than the other puncturing members 2^c and 2^d. The puncturing member 2^c is provided intermediate its ends and in its side wall with a vent opening 2^e for permitting air to enter the can A after being punctured, said vent opening being preferably formed by rupturing and bending in the side wall thereof so that the same may be easily pierced in case the same becomes clogged with the contents of the can A. The can puncturing member 2^d is preferably three sided and is provided in its side walls with openings 2^f through which the contents of the can A may be discharged. The one lateral side of the cover 2 is provided with a spout 2^g which extends beyond the side of the main portion of the cover and also preferably extends a slight distance above the same. This spout communicates with the interior of the hollow can puncturing member 2^d and communicates with the interior of the can A through the opening 2^f.

The interior of the can puncturing vent member 2^c communicates with the upper side of the cover 2 through a port 2^h. This port 2^h is slightly enlarged intermediate its ends providing a recess for the reception of a ball 5 for sealing the vented end of the can A from the atmosphere when the pitcher is not in use for draining the contents from the can A. To open up the port 2^h when desiring to dispense the contents from the can A, I have provided an upwardly inclined elongated recess 2^i which communicates at its one end with the port 2^h near the seat of the ball 5 which permits the ball 5 to be displaced by gravity into the recess 2^i when the device is tilted forwardly.

Within the recess of the cover at the inner side thereof is positioned the gasket 3, which may be made of rubber or any other suitable material, for sealing the punctured portion of the can A between the puncturing members at the inner side of the cover.

In the bottom of the container 1 is provided a recess 1^c in which is loosely positioned a compression spring 4 which is adapted to engage the under side of the can A for yieldably holding the same against the gasket 3. The bottom of the container 1 may also be provided with an opening 1^d to facilitate the removal of the can A if desired, particularly if the spring 4 is eliminated.

To puncture the upper end of the can A, the same is placed within the container 1; the puncturing member 2^b of the cover 2 is then positioned substantially over the central portion of the upper end of the can A and pressed downwardly, it being noted that considerable space is provided between the side walls of the can A and the wall of the container 1 to provide considerable leeway in centralizing the puncturing member 2^b in the upper end of the can A; the other puncturing members 2^c and 2^d are then pressed partially into the head end of the can and the threaded flange 2^a of the cover 2 screwed onto the threads 1^b of the container 1, forcing said puncturing members farther through the upper head end of the can A, as shown, it being noted that the can A is permitted to revolve with the cover 2 as the same is screwed over the upper open end of the container 1.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, a container adapted to receive and revolubly support a can, and a cover screwed over the one end of said container and provided with a central centering punch and with a spout adapted to communicate with the interior of the can adapted to be positioned in said container, said cover being provided with puncturing means at its inner side communicating with said spout.

2. In a device of the class described, a container adapted to receive and revolubly support an hermetically sealed can, and a cover screwed over the one end of said container provided with a central centering punch and provided at its inner side with a pair of hollow puncturing members for puncturing the one end of a can adapted to be positioned in said container, the one puncturing member being adapted for venting said can and the other for draining the contents therefrom, said cover being provided with a spout at one side communicating with said last mentioned puncturing member.

3. In a device of the class described, a container adapted to receive and rovolubly support an hermetically sealed can, a cover screwed over the one end of said container provided with a central centering punch and provided at its inner side with a pair of hollow puncturing members for puncturing the one end of a can adapted to be positioned in said container, the one puncturing member being adapted for venting said can and the other for draining the contents therefrom, said cover being provided with a spout at one side communicating with said last mentioned puncturing member, and a gasket positioned at the inner side of said cover around said puncturing members, and covering the whole upper surface of said can.

4. In a device of the class described, a container adapted to receive and revolubly support an hermetically sealed can, a cover screwed over the one end of said container provided with a central centering punch and provided at its inner side with a pair of hollow puncturing members for puncturing the one end of a can adapted to be positioned in said container, the one puncturing member being adapted for venting said can and the other for draining the contents therefrom, said cover being provided with a spout at one side communicating with said last mentioned puncturing member, and a ball check valve member positioned in said cover over the hollow puncturing member for venting the can adapted to be positioned in said container, and a gasket interposed between said cover and said can and covering the whole upper surface of said can.

5. In a device of the class described, a container in the semblance of a pitcher having a readily removable cover, a can centralizing puncturing member at the center of the inner side of said cover of considerable length, a pair of hollow puncturing members at the inner side of said cover at substantially diametrically opposite sides of said first mentioned puncturing member and shorter than said first mentioned puncturing member, said hollow puncturing members being provided with holes in their side walls, and a spout on said cover extending beyond the lateral side thereof and communicating with one of said hollow puncturing members.

6. In a device of the class described, a container in the semblance of a pitcher having a readily removable cover, a can centralizing puncturing member at the center of the inner side of said cover of considerable length, a pair of hollow puncturing members at the inner side of said cover at substantially diametrically opposite sides of said first mentioned puncturing member and shorter than said first mentioned puncturing member, said hollow puncturing members being provided with holes in their side walls, a spout on said cover extending beyond the lateral side thereof and communicating with one of said hollow puncturing members, and a compression spring means positioned in the bottom end of said container for forcing a can adapted to be revolubly positioned therein against the inner side of said cover.

7. In a device of the class described the combination with a can, of a container adapted to receive and revolubly support said can, a removable cover for the one end of said container, a plurality of can puncturing means on the inner side of said cover and coacting screw means on said container and cover for simultaneously forcing said puncturing means into said can and securing said cover to said container.

In testimony whereof, I have hereunto set my hand at San Diego, California, this 26th day of May, 1925.

LEO B. PAULSON.